United States Patent [19]

Itoh et al.

[11] Patent Number: 4,682,869
[45] Date of Patent: Jul. 28, 1987

[54] IMAGE PROCESSING SYSTEM AND METHOD

[75] Inventors: Masaharu Itoh, Fujisawa; Taketoshi Yokemura; Hiroshi Yanagisawa, both of Yokohama, all of Japan

[73] Assignee: International Business Machines Corporation, Armonk, N.Y.

[21] Appl. No.: 686,578

[22] Filed: Dec. 27, 1984

[30] Foreign Application Priority Data

Dec. 28, 1983 [JP] Japan .............................. 58-245622

[51] Int. Cl.⁴ .............................................. H04N 1/40
[52] U.S. Cl. .................................. 358/260; 358/261; 358/280; 358/284
[58] Field of Search ............... 358/260, 261, 280, 284, 358/287

[56] References Cited

U.S. PATENT DOCUMENTS

| | | | |
|---|---|---|---|
| 4,028,731 | 7/1977 | Arps et al. | 358/260 |
| 4,365,273 | 12/1982 | Yamada et al. | 358/260 |
| 4,470,072 | 9/1984 | Tanaka et al. | 358/260 |

Primary Examiner—Edward L. Coles, Sr.
Attorney, Agent, or Firm—Kenneth A. Seaman

[57] ABSTRACT

An image processing system to allow communication with input and output devices having varying resolutions. An image processing system converts an image into a compressed base image and successive levels of error correction data so that an output of the image may be provided with any desired level of resolution (up to that of the input) with further levels of resolution obtained through predictive techniques. Advantageously, the error coding data is arithmetically coded.

5 Claims, 9 Drawing Figures

IMAGE PROCESSING SYSTEM AND METHOD

BACKGROUND OF THE INVENTION

1. Field of the Invention

This invention relates to an image processing system and method, and more particularly to such a system including a plurality of image processing devices having different resolutions.

2. Background Art

Recently, image processing devices such as facsimiles have come into wide use, and their processing environment advances from a local one to a systematic one.

Differing from coded data, image data has no meaning by itself, but has meaning when it is developed on a two-dimensional plane. Thus, the image depends on parameters defining the plane such as the numbers of vertical and horizontal pels, gray levels, and so on, which usually differ from device to device. This leads to problems of various resolution, compression/decompression and image data transmission.

Input/output devices for images (scanners, printers, displays, and so on) being currently manufactured have various resolutions, but it is difficult to interconnect the devices having different resolutions. A problem of how to perform conversion of the different resolutions may because it may be desirable to store image data with different resolutions would be stored in a common image data base in the future.

At present, there are methods of compression of image data such as the Modified Huffman and the Modified READ, which define their codes (or compression conversions) based on the statistics of image data having a predetermined resolution. Therefore, if the resolution differs, optimum coding (compression conversions) cannot be performed.

Generally, the display has a lower resolution than the scanner. When it is intended to display an image scanned by the scanner on the display, it is currently generally accomplished in such a manner that high resolution image data is transferred to the display in its entirety, where it is converted to low resolution image data. This results in wasteful data transmissions. A more preferable way would be to send only image data that fits the resolution of a receiving device.

These problems relate to expression methods of image data. Conventional methods such as binary, mosaic, DF and run length expressions cannot solve the problems because they do not consider the difference of resolutions.

Arranging image data in a hierarchial or pyramidal manner is well known in the prior art and described, for example, in U.S. Pat. No. 4,222,076 and K. R. Sloan, Jr., S. L. Tanimoto, "Progressive Refinement of Raster Images," IEEE TRANSACTIONS ON COMPUTERS, Vol. c-28, No. 11, November 1979, pp. 871-874. However, the conventional image data structures have been devised with the purpose of retrieving, and the data contents of the respective layers are different from those of the invention. In addition, the hierarchial systems they have a disadvantage that larger storage space is required as compared with only storing the original image data.

Other limitations and disadvantages of prior art systems will be apparent to those skilled in the art in view of the following description of the present invention, taken with the appended claims and the accompanying drawings.

SUMMARY OF THE INVENTION

An object of the present invention is to accommodate and integrate a plurality of image processing input and output devices having different resolutions into a single system.

According to the present invention, each image to be transmitted or stored is expressed by some separate layers called resolution layers (RSL's). Each layer corresponds to a different resolution. The first layer is a base layer and contains a compressed base image (CBI). Its resolution is the lowest. Remaining layers contain error compensation data (ECD), and the resolution becomes higher as the layer advances. According to the RSL expression of the present invention, the entire volume stored for each image can be equal to or less than the amount of original image data; the expression is independent of the devices and statistical characteristics of the images, and only required data is transmitted.

In the RSL expression, the base layer data (base image) is constructed by generating image data of lowest resolution from the original image data and compressing it by an appropriate algorithm such as the Modified READ or the prediction coding with the arithmetic code. Each of the data in other layers, i.e. the error compensation data represents error between a predicted image reproduced using data from the base layer up to a layer one level prior to that layer and an actual image having a resolution corresponding to that layer. Therefore, a correct image is obtained by modifying the predicted image with the error compensation data. Preferably, the arithmetic coding is used for the error compensation data, which will be further described later.

When desired image data is to be transmitted to and reproduced by a particular image processing device, actually transmitted is only data of up to a layer corresponding to the resolution of that device.

DETAILED DESCRIPTION OF THE BEST MODE FOR FOR CARRYING OUT THE INVENTION

Figure 1:
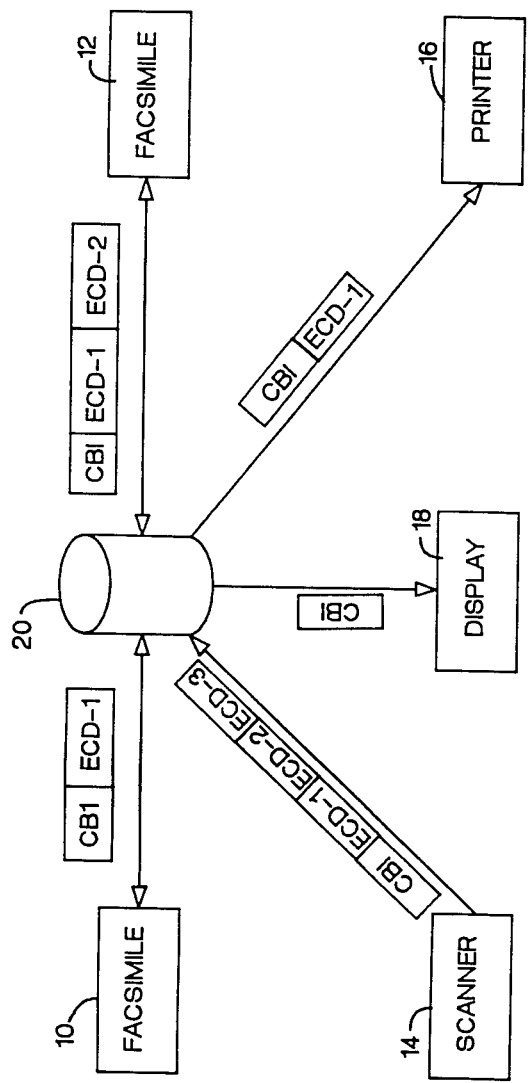
FIG. 1 is a block diagram illustrating a configuration of the image processing system according to the present invention.

FIG. 1 shows an illustrative configuration of an image processing system 5 according to the present invention. This system 5 as depicted includes facsimiles 10 and 12, a scanner 14, a printer 16 and a display 18 which communicate through an image data base 20. Any quantity and type of image processing devices can be used in the system 5 because the RSL expression of the invention is independent of the physical characteristics of the image processing devices. An illustrative resolution of the various image processing devices is:

Facsimile 10: 8 pels/mm
Facsimile 12: 10 pels/mm
Scanner 14: 16 pels/mm
Printer 16: 10 pels/mm
Display 18: 4 pels/mm Each of the foregoing image processing device may be of commercial design of a type well known in the art. No further detail on its construction or mode of operation is necessary for an understanding of the present invention.

Although not shown in the drawing, the image data base 20 is usually provided in either a host processor or a central store-and-forward station. The image data base 20 receives and stores image data CBI and ECD-i (i=1, 2, ...) of the RSL expression, which is described later, from the various image processing devices, e.g., the facsimiles 10 and 12, and the scanner 14. The image data base 20 sends as output image data only up to the desired layer to each image processing device 10, 12, 14, 16 and 18, as the case may be.

For example, first image data may be initially originally generated by the scanner 14 and later it is desired to output such first image data via the printer 16. In that instance, only CBI and ECD-1 (corresponding to the resolution of the printer 16) are sent from the image data base 20. For a second example, when second image data originally generated by the facsimile 10 is sent to the facsimile 12 as an output, only CBI and ECD-1 are sent from the image data base 20. The low resolution of the facsimile 10 created only the CBI and the FCD-2 information. So even though the facsimile 12 could accept ECD-2 information, in this second example such ECD-2 infor does not exist and therefore, is not sent.

Figure 2:
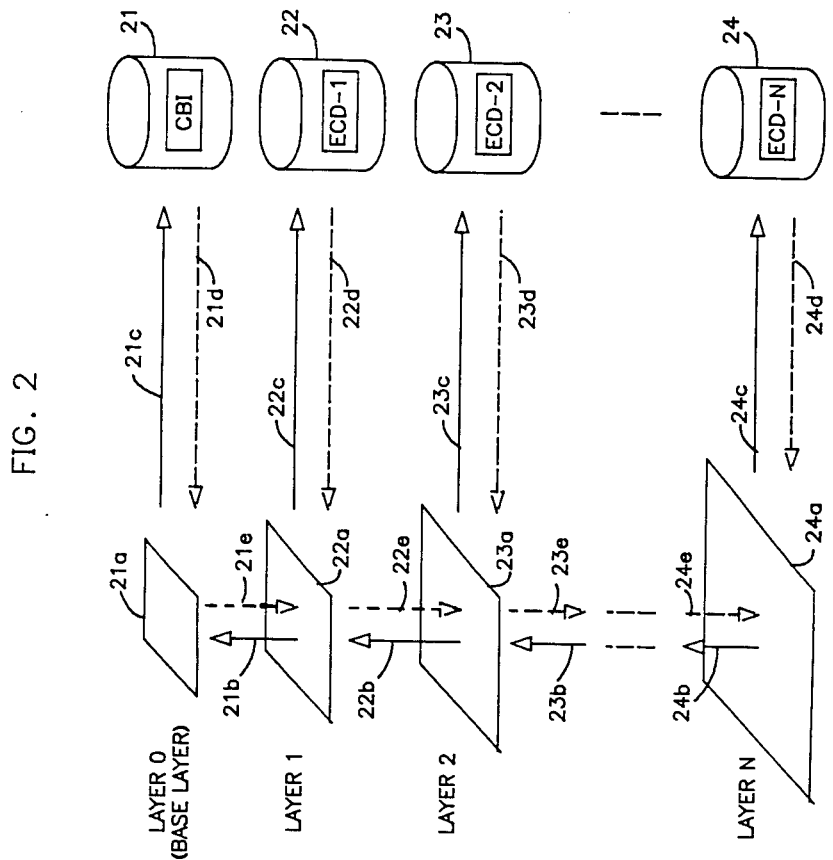
FIG. 2 illustrates the resolution layers (RSL) of an image used in the image processing system of FIG. 1.

FIG. 2 describes the RSL expression of the present invention. The RSL representation consists of a compressed base image (CBI) 21 representing layer 0 (base layer) 21a, and N error compensation data (ECD-1–ECD-N)22, 23, and 24 representing layers 1–N, 22a, 23a, and 24a, respectively. Each of the layers 0-N is associated with a different resolution which is the lowest for the layer 0, becomes higher as it approaches the layer N, and is the highest for the layer N. The resolution associated with the layer N is that of a device (for example, facsimile 10 of FIG. 1) which creates this RSL expression by scanning an image, and therefore the value of N is not fixed in the system. That is, N=1 for the facsimile 10 of FIG. 1 and N=3 for the scanner 14.

The CBI represents an actual image (in compressed form) having the lowest resolution, while the ECD does not represent the actual image but an error or correction factor between the actual image and the predicted image. Therefore, for example, when the actual image of the layer 1 is composed by using the RSL expression already created, ECD-1 is added to the base image that is obtained by decompressing the CBI. The images of the layers 2-N are similarly composed. However, if it is desired to obtain an image of higher resolution than the layer N by using the RSL expression containing only up to the layer N, an appropriate pel density conversion (prediction) technique would be used, which will be described later in connection with FIG. 8. In FIG. 2, the solid arrows 21b, 22b, 23b, 24b, 21c, 22c, 23c, and 24c, show an image decomposing process, while the dotted arrows 21d, 22d 23d, 24d, 21e, 22e, 23e, and 24e show the image composing process.

Figure 3:
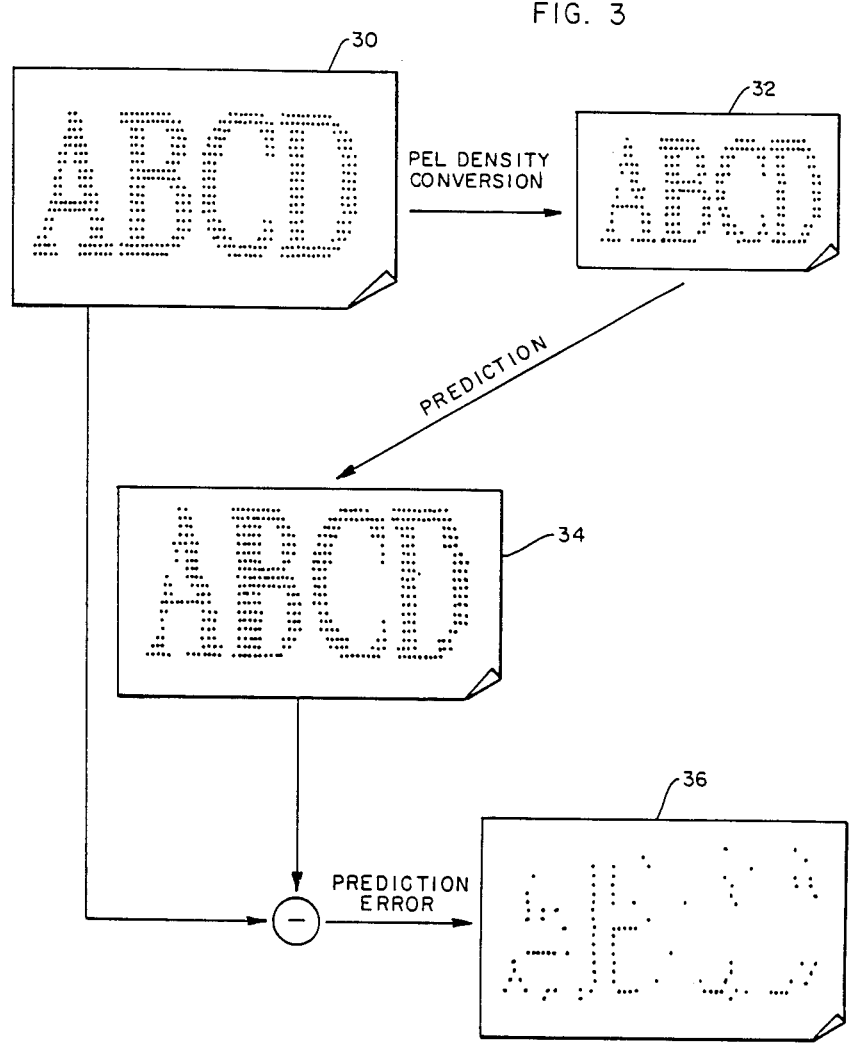
FIG. 3 shows a basic image decomposing process.

FIG. 3 illustrates an example of an image decomposing process, which is the basis to create the RSL expression such as shown in FIG. 2. First, a higher resolution image (HRI) 30 is subjected to the pel density conversion to generate a lower resolution image (LRI) 32 which is one level lower than the HR1 30. If the layer for HRI 30 is assumed i (i=1, 2, ... N), the layer for LRI 32 is i−1. Then, by applying an appropriate prediction algorithm to the LRI 32, a predicted higher resolution image (PHRI) 34 having the same resolution as the HRI 30 (layer=i) is generated. Finally, error compensation data (ECD) 36 or prediction error is generated by measuring the difference between the HRI 30 and the PHRI 34. This process begins with the original image (layer N) and is repeatedly performed until the base image (representing CBI) (layer 0) is obtained as the LRI 32.

Figure 4:
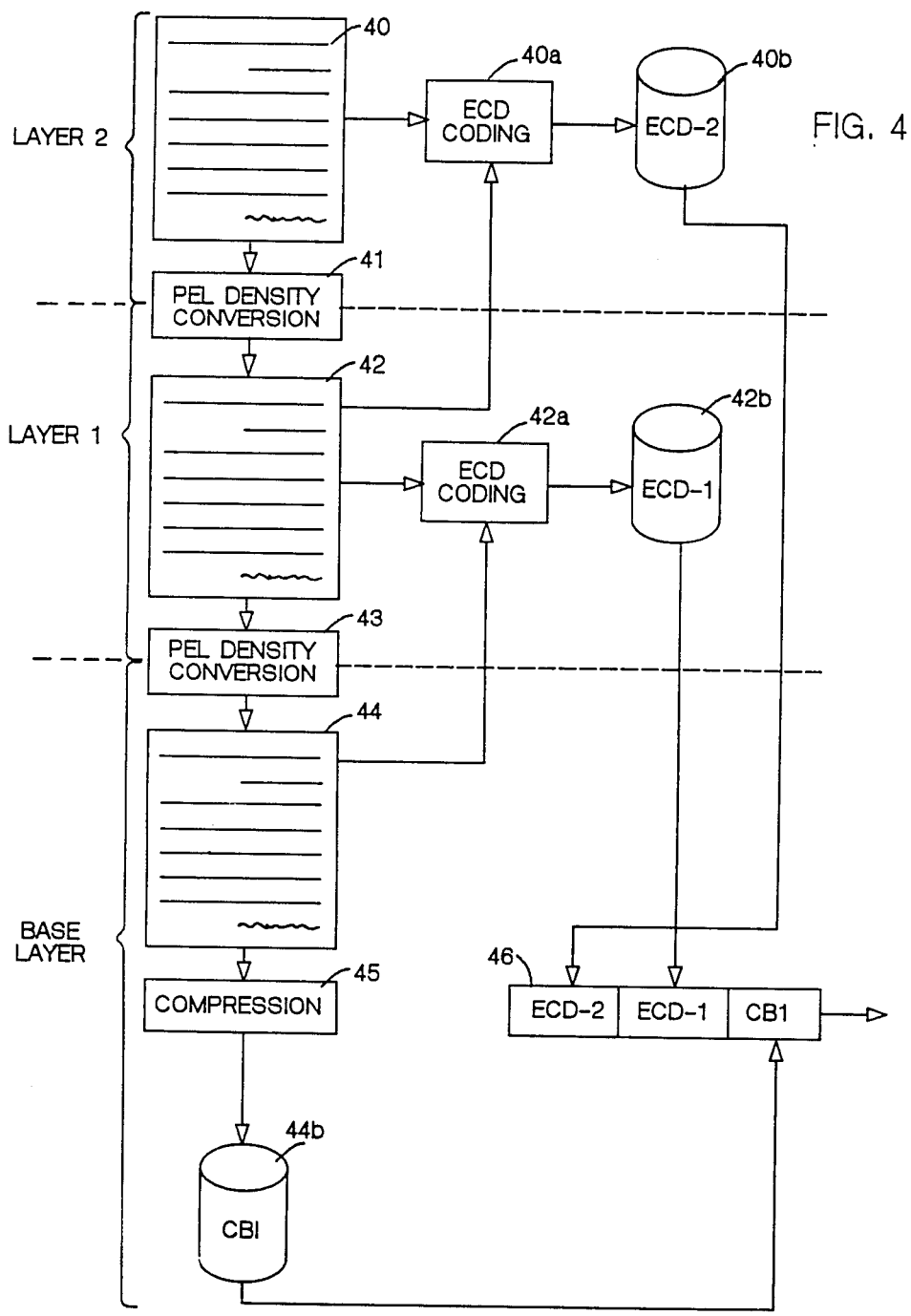
FIGS. 4 and 5 show block diagrams of image decomposing and composing processes in selected image processing devices, respectively.

FIG. 4 shows an example where the above-mentioned image decomposing process is applied to the facsimile 12 shown in FIG. 1. The facsimile 12 has the resolution of 10 pels/mm, for which the number of layers N+1 in the RSL expression is 3 because its resolution is third from the lowest in the system shown in FIG. 1.

The facsimile 12 first produces an original image 40 belonging to the layer 2 by scanning a document (not shown). Then, a first LRI 42 having the resolution of 8 pels/mm is generated by subjecting the original image 40 to the pel density conversion at block 41. Error compensation data ECD-2 stored on storage 40b for the layer 2 is obtained at block 40a by encoding the above-mentioned prediction error. Preferably, it is accomplished by the arithmetic coding, the details of which will be described later. Then, a second LRI or base image 44 having the resolution of 4 pels/mm is generated by halving the pel density of the LRI 42 at pel density conversion block 43, to obtain error compensation data ECD-1 for the layer 1. ECD-1 which is stored on storage 42b is obtained by encoding at block 42a the difference between the LRI 42 and an image predicted from the base image 44. Again, the arithmetic coding is used in the preferred embodiment. Finally, the base image is compressed at block 45 by, for example, the Modified READ, and becomes the CBI shown as stored on storage 44b. The facsimile 12 forms the RSL data stream 46 comprising of the CBI, ECD-1 and ECD-2, and sends it to a host processor (not shown). The host processor stores the RSL data stream 46 in the image data base 20.

Figure 5:
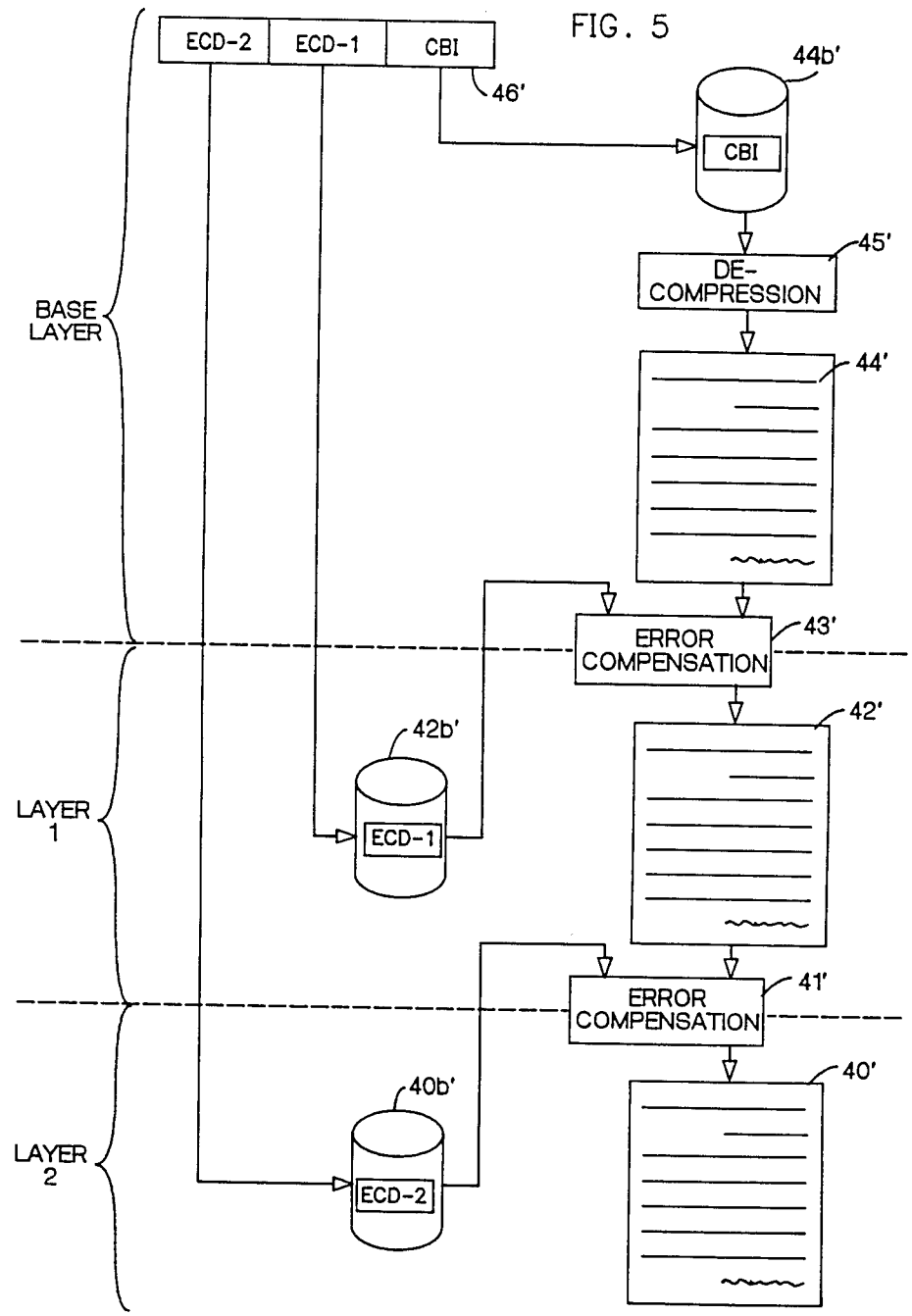

As shown in FIG. 5, a process for using the CBI, ECD-1 and ECD-2 contained in the RSL data stream 46' to reproduce the original image 40' is just the reverse of the decomposing process shown in FIG. 4. First, the base image 44' is reproduced by decompressing at block 45' the CBI, from block 44b'. The first LRI 42' is then reproduced by decoding the ECD-1 from block 42b' and adding it to the base image 44' at block 43'. Finally, the original image 40' is reproduced by decoding the ECD-2 from block 40b, and adding it to the LRI 42' at block 41'.

In the following, the pel density conversion (reduction), the prediction and the arithmetic coding will be described in detail, which are briefly referred to with reference to FIGS. 3 and 4.

There are various pel density conversion methods such as the linear interpolation and projection methods for obtaining the LRI 32 from the HRI 30 in FIG. 3. The linear interpolation is the preferred technique used in connection with the present invention because it does not significantly degrade image quality by the conversion, and is simple. However, as long as the RSL expression is concerned, there is no need to restrict the pel conversion to a specific method.

Figure 6:
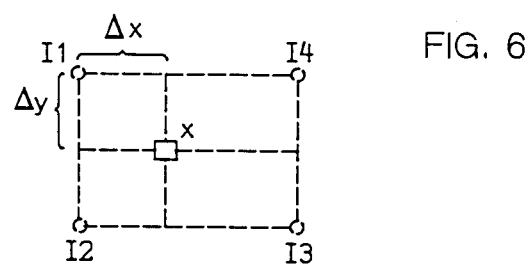
FIGS. 6 and 7 shows examples of preferred pel prediction techniques.
Figure 7:
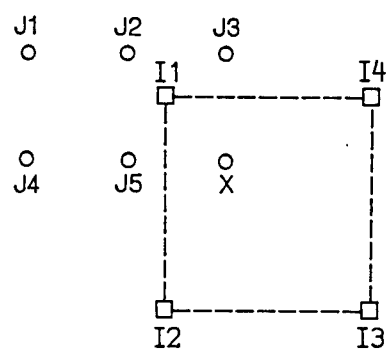

FIG. 6 shows an example to estimate a specific pel value in the LRI from the values of four HRI pels surrounding it. In this case, a binary image is assumed, in which 0 represents a white pel, 1 a black pel. In the drawing, the circles represent the HRI pels, while the square represents the LRI pel. (The same is applied to FIG. 7 below.) The gray level value P of the object pel or LRI pel X is calculated from the following equation:

$$P = (1-\Delta x)(1-\Delta y)I1 + (1-\Delta x)\Delta y\ I2 + \Delta x\ \Delta y\ I3 + \Delta x(1-\Delta y)\ I4$$

If the value of P is equal to or greater than 0.5, X is estimated to be 1 (black), while if the value is less than 0.5, X is estimated to be 0 (white). In the above equation, the values of $\Delta x$ and $\Delta y$ can be easily calculated if the location of a reference pel of HRI and LRI (for example, a pel at the upper left end) and the conversion rate (4/5 in case of the conversion from 10 pels/mm to 8 pels/mm) are known. The values of four HRI pels I1-I4 are known.

As described, since the LRI is obtained by reducing the pel density or resolution of the HRI, there is strong correlation between the pels of HRI and LRI. Therefore, when the HRI is conversely predicted from the LRI, its prediction error would be little, and the amount of error compensation data (ECD) obtained by encoding the error would be small. Since the prediction of HRI is performed for each pel, and therefore the prediction probability is also given for each pel, the arithmetic coding utilizing the prediction probability for each pel is more suitable for encoding the ECD than, for example, the Huffman coding that encodes a block of pels by a table lookup. The arithmetic coding also provides better coding efficiency.

In principle, the prediction of the HRI from the LRI can be performed by the same linear interpolation method as explained with reference to FIG. 6. However, it is desirable to reduce the prediction error as much as possible so that the amount of ECD data is reduced and the compression ratio is increased. The equation of the linear interpolation is cited below:

$$P = (1-\Delta x)(1-\Delta y)\ I1 + (1-\Delta x)\ \Delta y\ I2 + \Delta x\ \Delta y\ I3 + \Delta x(1-\Delta y)\ I4$$

In this case, however, I1-I4 are the values (0 or 1) of four LRI pels surrounding the HRI pel to be predicted. The above equation may be calculated for each pel, but it is also possible to concatenate $\Delta x$, $\Delta y$ and the values of I1-I4 to form an address of, for example, 12 bits (each four bits for $\Delta x$ and $\Delta y$, and each one bit for I1-I4), and to access a probability table by the address. In the latter case, it is desirable to load each entry of the probability table with a probability value reflecting the statistical characteristics of the image, rather than the calculated value of the above equation.

Such a probability table could be created in the following manner: If the address is 12 bits, the probability table has 4096 entries. First, a total counter Ti and a black counter Bi (i=1, 2, ... 4096) are provided for each entry. Then, a 12-bit address is generated for each HRI pel to be predicted by concatenating $\Delta x$, $\Delta y$ and the values of I1-I4, and the value of an actual HRI pel is determined. The total counter Ti corresponding to the generated address is incremented by one, and the black counter Bi is incremented by one only if the value of the actual HRI pel is 1 (black). By repeating this process until the last HRI pel is reached, the total number of accesses (value of Ti) and the number of HRI pels which have been found to be black (value of Bi) are obtained for each entry of the probability table. Thus, calculating Bi/Ti provides the prediction probability (probability of black) based on the statistical characteristics of the image. In fact, the probability table will be prepared by repeating the above process for various images. The contents of the probability table may be dynamically changed.

However, even if the probability table is prepared in the above manner, the prediction error would likely to occur if the prediction probability is around 0.5. In such a case, the value of current HRI pel X may be predicted from nearby HRI pels which have been already predicted with high probability (for example, J1–J5 in FIG. 7). In any case, a prediction algorithm providing a prediction probability near 0 or 1 is desirable. All probabilities contained in the actual probability table are those of so-called less probable symbols in the arithmetic coding, and therefore less than 0.5.

Arithmetic coding is employed in the preferred embodiment to encode the ECD because:

(a) A section providing the probability (prediction unit) can be separated from a coding unit, and their structures can be independently designed because the coding is not based on the table lookup as in other systems such as the Huffman code.

(b) As the prediction is performed for every pel, the prediction probability varies pel by pel. The arithmetic coding can encode such a binary string having variable probabilities.

(c) It can be easily implemented by a hardware, and (d) The coding efficiency is very high.

The theoretical background of the arithmetic coding and its application to the black and white image have been briefly explained in the foregoing paragraphs. For further information regarding the subject, the following articles are relevant and hereby incorporated herein by reference:

(a) J. Rissanen, "Generalized Kraft Inequality and Arithmetic Coding," IBM Journal of Research and Development, Vol. 20, pp. 198–203, May 1976.

(b) G. Langdon, Jr., J. Rissanen, "Compression of Black-White Images with Arithmetic Coding" IEEE TRANSACTIONS ON COMMUNICATIONS, Vol. COM-29, No. 6, pp. 858–867, June 1981.

In view of the characteristics of ECD to be encoded, the more probable symbol (MPS) is assumed to be "0", and the less probable symbol (LPS) is assumed to be "1". Representing the coding output, the skew number (integer equal to or greater than one) and the auxiliary quantity for the input string s by C(s), Q(s) and A(s) respectively, the auxiliary quantity A(s0) and the coding output C(s0) when 0 is entered following the input string s, and the auxiliary quantity A(s1) and the coding output C(s1) when 1 is entered are expressed as follows:

$$A(s0) = A(s) - A(s1)$$

$$A(s1) = A(s) * 2^{-Q(s)}$$

$$C(s0) = C(s)$$

$$C(s1) = C(s) + A(s0)$$

A(s) represents the internal state of the coding unit, and its initial value is 0.11 ... 1 (binary digit). A(s0) or A(s1) is used as a new A(s) each time a symbol is encoded. $2^{-Q(s)}$ approximates the probability of occurrence of LPS, and is given from the prediction unit.

In decoding, if up to s' of the string s=s'ys" has been decoded, C(s) is compared with C(s')+A(s'0). If the former is larger, y is decoded as 1, otherwise as 0.

Figure 8:
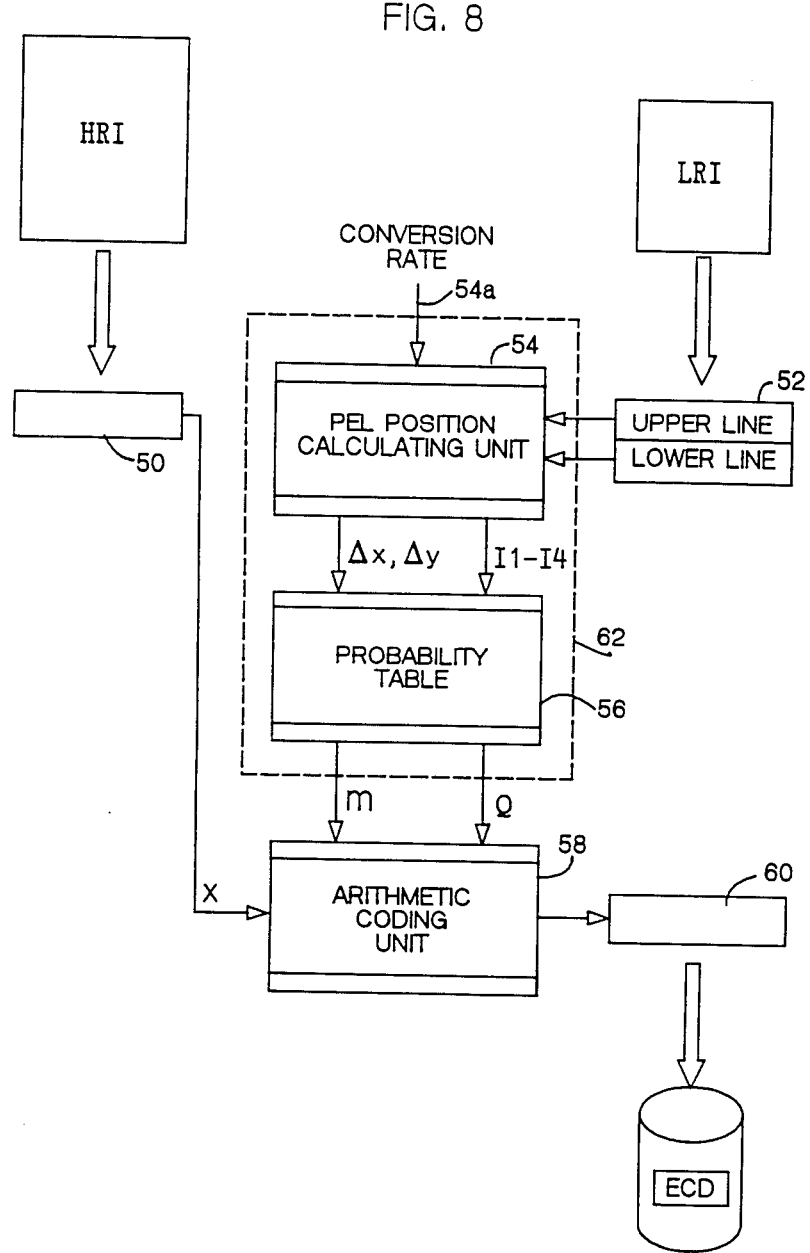
FIG. 8 shows a block diagram of hardware configuration for the prediction and arithmetic coding.

FIG. 8 shows an example in block diagram form of a hardware configuration for the prediction and arithmetic coding operations described in this patent. HRI line buffer 50 receives one HRI line containing the HRI pel to be predicted (for example, pel X in FIG. 7). LRI line buffer 52 receives two LRI lines between which the HRI line is positioned (in the example of FIG. 7, an upper line containing the LRI pels I1 and I3, and a lower line containing the LRI pels I2 and I4). The line data in the LRI line buffer 52 is supplied to a pel position calculating unit 54. In addition to the line data, the pel position calculating unit 54 also receives the conversion rate (HRI/LRI)on line 54a, and outputs the values of Δx and Δy, as well as of four LRI pels I1–I4 surrounding the HRI pel to be predicted. These values are used to access a probability table 56. Each entry of the probability table 56 contains the predicted value of a corresponding HRI pel or value m representing the more probable symbol in the arithmetic coding, and the value Q (for example, 4 bits) approximating by a power of two a probability that the HRI pel to be predicted is the less probable symbol. The values m and Q read from a selected entry are supplied to an arithmetic coding unit 58. The unit 58 receives the actual value X of the HRI pel to be predicted from the line buffer 50 in addition to m and Q, and outputs to a buffer 60 the aforementioned C(s0) or C(s1) as the ECD depending on whether or not m equals to X. The pel position calculating unit 54 and the probability table 56 constitute a prediction unit 62.

Figure 9:
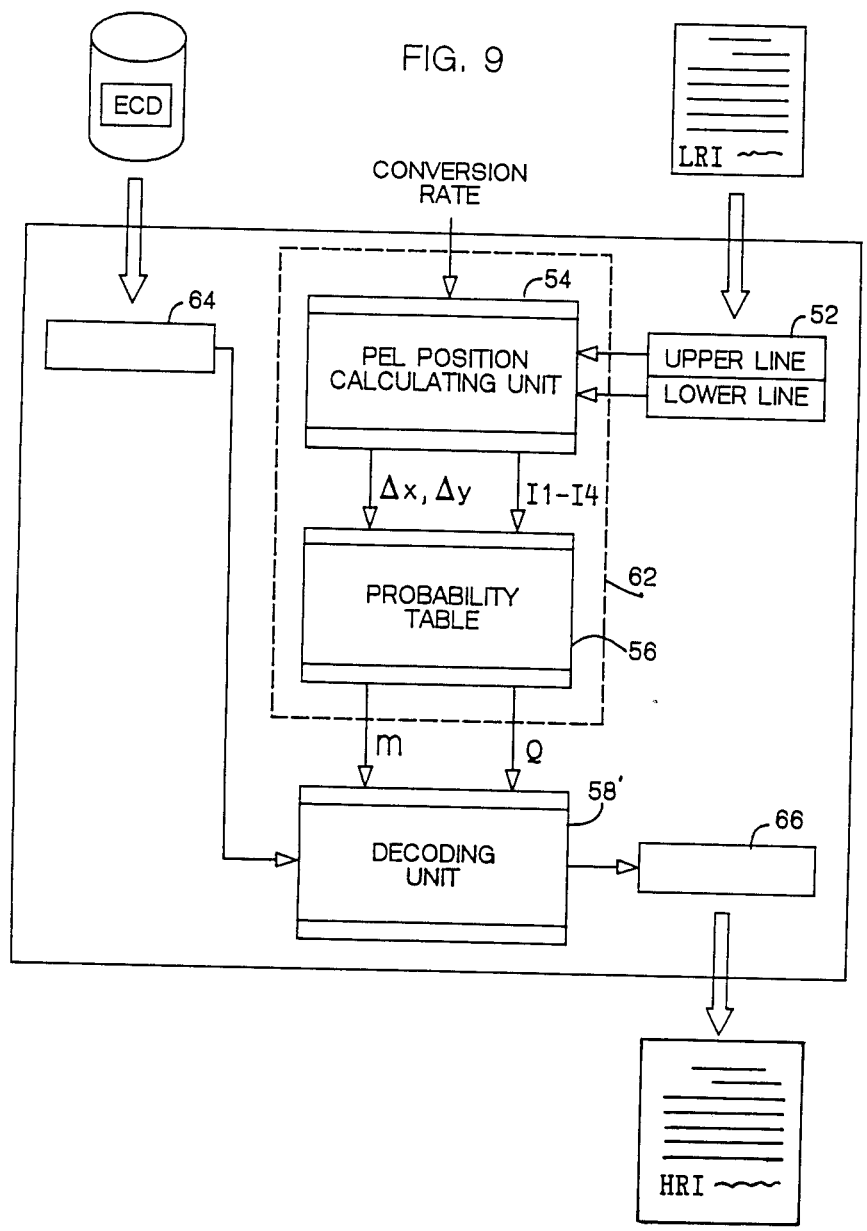
FIG. 9 shows a block diagram of hardware configuration for decoding image data encoded by the hardware configuration shown in FIG. 8.

As shown in FIG. 9, an apparatus for composing (decoding) the HRI from the LRI and the ECD can be substantially the same as that shown in FIG. 8. The ECD is sent to a decoding unit 58' through a buffer 64. The unit 58' is the same as the arithmetic coding unit 58 in FIG. 8 except for a comparator (not shown) for comparing C(s) with C(s')+A(s'0). A line buffer 66 stores a line of HRI pels from the decoding unit 58', and outputs it to a separate storage unit (not shown). The HRI outputted to the storage unit would be read out as the LRI to the line buffer 52 if it is required to compose an image of higher resolution.

Each layer does not necessarily require a separate apparatus of the type shown in FIGS. 8 and 9. One such apparatus can be commonly used for all layers except the base layer. For the base layer, compression (coding) and decompression (decoding) may be performed according to an appropriate well known algorithm such as the Modified READ. Alternatively, they may be performed in a manner described in the above cited articles if it is desired to use the arithmetic coding. The Modified READ algorithm is based on the resolution of 8 pels/mm (200 pels/inch) and, therefore, the compression ratio would be deteriorated if the resolution of the base layer differs from it (4 pels/mm in the embodiment). In such a case, it would be preferable to employ a different algorithm.

Although the preferred embodiment of the invention has been described in some detail in the preceding paragraphs it is frequently desirable to make the resolutions of the respective layers in the RSL expression consistent with those of the devices in the system. In the example in FIG. 1, CBI, ECD-1, ECD-2 and ECD-3 correspond to the resolutions of 4 pels/mm, 8 pels/mm, 10 pels/mm and 16 pels/mm, respectively. These resolutions are realized by suitably changing the conversion rate to the pel position calculating unit 54.

It may desired in some instances to centrally control the communication between the image processing devices by the host processor including the image data base 20. In those instances, the host processor may be provided with a coincidence table for the device addresses and the resolutions of all image processing devices included in the system. By referring to this coincidence table, the host processor will send to a receiving image processing device image data only up to the one having a resolution of the receiving device.

Having thus described our invention, what we claim is:

1. A system for communicating an image between devices having resolutions which may vary, the system comprising:

means for receiving an input image from a first device having a first resolution level;

means for converting the input image into an image representing a lower level of resolution and a set of correction information representing a difference between the input image and a predicted image;

means for determining if the converted lower level of resolution is a fixed base level of resolution and for repeating the converting and determining steps if said lower level is not the fixed base level, said repeated conversion step using the image representing the lower level of resolution as the input image;

means for storing image data representing the base level and each set of correction information generated; and means for regenerating an image at a second resolution for use in a second device having a second resolution which may differ from that of the first device including means for recalling the image data representing the base level and means for recalling a set of correction information, means for using the image data and the correction information to generate a higher level image and, if the higher level image is not equal to the second resolution, for repeating the use of image data and another set of correction data until the second resolution is reached.

2. A method of processing images from a first device having a first resolution for use in a second device having a second resolution which may not equal the resolution of the first device, the steps of the method comprising:

receiving an input image from the first device;

converting the input image into an image representing a lower level of resolution and a set of correction information representing a difference between the input image and a predicted image;

determining if the converted lower level of resolution is a preset base level of resolution and repeating the converting and determining steps if said lower level is not the preset base level, said repeated converting step using the image representing the lower level of resolution as the input image;

storing image data representing the base level and each set of correction information generated; and generating an image at the second resolution for use in the second device including the steps of recalling the stored image data representing the base level and a set of correction information, using the image data and the correction information to generate a higher level image and, if the higher level image is not equal to the second resolution, repeating the steps of using the higher level image data and another set of correction data until the second resolution is reached.

3. A method of processing images having the steps of claim 2 wherein the step of converting the input image includes the step of arithmetically encoding information representing the difference between the input image and the predicted imaged.

4. A method of generating an output image at a predetermined resolution which may differ from the resolution of an input image including the steps of:

receiving the input image having a first resolution level;

coverting the input image into an image representing a lower level of resolution and a set of correction information representing a difference between the input image and a predicted image;

determining if the converted lower level of resolution is a predetermined base level of resolution and for repeating the converting and determining steps if said lower level is not the predetermined base level, said repeated conversion step using the image representing the lower level of resolution as the input image;

storing image data representing the base level and each set of correction information generated; and recreating the output image at a second resolution for use in a second device having a second resolution which may differ from that of the first device including the steps of recalling the image data representing the base level and a set of correction information, using the image data and the correction information to generate a higher level image and, if the higher level image is not equal to the second resolution, repeating the steps of using image data and another set of correction data until the second resolution is reached, with a predicted set of correction data being used for a level if correction data is not available for that level.

5. A method of processing image information for use in transmission between stations having varying resolutions, the steps of the method comprising:

receiving the input image having a first resolution level;

converting the input image into an image representing a lower level of resolution and a set of correction information representing a difference between the input image and a predicted image;

determining if the converted lower level of resolution is a predetermined base level of resolution and for repeating the converting and determining steps if said lower level is not the predetermined base level, said repeated conversion step using the image representing the lower level of resolution as the input image;

storing image data representing the base level and each set of correction information generated.

* * * * *